United States Patent [19]

Kim

[11] Patent Number: 5,239,419
[45] Date of Patent: Aug. 24, 1993

[54] EDITING SYSTEM FOR COMBINED CAMERA AND VIDEO TAPE RECORDER

[75] Inventor: Kyung-tae Kim, Kyunggi-do, Rep. of Korea

[73] Assignee: SamSung Electronics Co., Ltd., Suwon, Rep. of Korea

[21] Appl. No.: 636,422

[22] Filed: Dec. 31, 1990

[51] Int. Cl.⁵ .................. G11B 27/02; H04N 5/78; H04N 5/30

[52] U.S. Cl. .................. 360/14.1; 360/33.1; 358/224; 395/135

[58] Field of Search .............. 360/14.1–14.3, 360/33.1, 13; 358/335, 331, 310, 342, 224; 395/133–135; 340/707, 712

[56] References Cited

U.S. PATENT DOCUMENTS

| | | |
|---|---|---|
| 4,189,744 | 2/1980 | Stern .................. 358/310 |
| 4,258,385 | 3/1981 | Greenberg et al. .................. 358/22 |
| 4,858,012 | 8/1989 | Hemo et al. .................. 360/14.1 |
| 5,008,854 | 4/1991 | Maeda et al. .................. 395/135 |
| 5,142,616 | 8/1992 | Kellas et al. .................. 395/135 |

*Primary Examiner*—Aristotelis Psitos
*Assistant Examiner*—Varsha V. Sheladia
*Attorney, Agent, or Firm*—Robert E. Bushnell

[57] ABSTRACT

An editing system for a combined video camera and video tape recorder is disclosed. The editing system for a combined camera and video tape recorder having a picture display and recording portion comprises a picture input portion in which a second picture is manually drawn by the user and a picture composing portion for superimposing the second picture signal on the picture signal input to the picture display. According to the invention, the secondary pictures such as various titles can be added to the recorded program without erasing any portion of the recorded program.

7 Claims, 3 Drawing Sheets

EDITING SYSTEM FOR COMBINED CAMERA AND VIDEO TAPE RECORDER

FIELD OF THE INVENTION

This invention relates to a portable picture recording system including a video camera and a video camera recorder, and more particularly to an editing system for a combined video camera and video tape recorder.

DESCRIPTION OF THE PRIOR ART

During the past few years, a combined video camera and video tape recorder (hereinafter, referred to as a camcorder) has become remarkably widespread for domestic use as well as for business use since it is convenient to carry and operate, and it is able to record and reproduce a desirable program for a long time.

By the way, in the recorded program, it is necessary to add an additional picture such as a proper title.

Therefore, a conventional program editing apparatus has been developed such that the title or subtitle, etc. photographed separately, then, is superimposed on the recorded program.

However, in such a case, two or more VTR sets and a processor for picture-editing are necessary.

In recent years, a camcorder having a simplified editing system has been developed, but its use is limited since a portion of the recorded program is erased and the title, etc. is recorded on the erased portion.

It is, therefore, impossible to insert the subtitle if the portion of the program to be erased is important matter.

SUMMARY OF THE INVENTION

The present invention eliminates the above problems and drawbacks of the conventional system, and provides a camcorder which can superimpose the additional picture on the recorded program without a separate editing process.

To accomplish the above objects, the editing system for a camcorder having a picture displaying portion and a recording portion according to the present invention, comprises a means for inputting a second picture by the user, and a picture composing portion for combining the secondary picture signal with the primary picture signal.

In this case, it is desirable that the primary picture signal is a video signal which is being photographed by camcoder, or a video signal input from a separate video tape recorder, or the video signal which is read-out from a separate picture memory or video signal.

According to the present invention as constructed above, it is possible for the user to input a secondary picture such as a title or subtitle without erasing the recorded program.

Other objects and features will be obvious from the explanations made in accordance with the accompanying drawings.

DETAILED DESCRIPTION OF THE INVENTION

Figure 1:
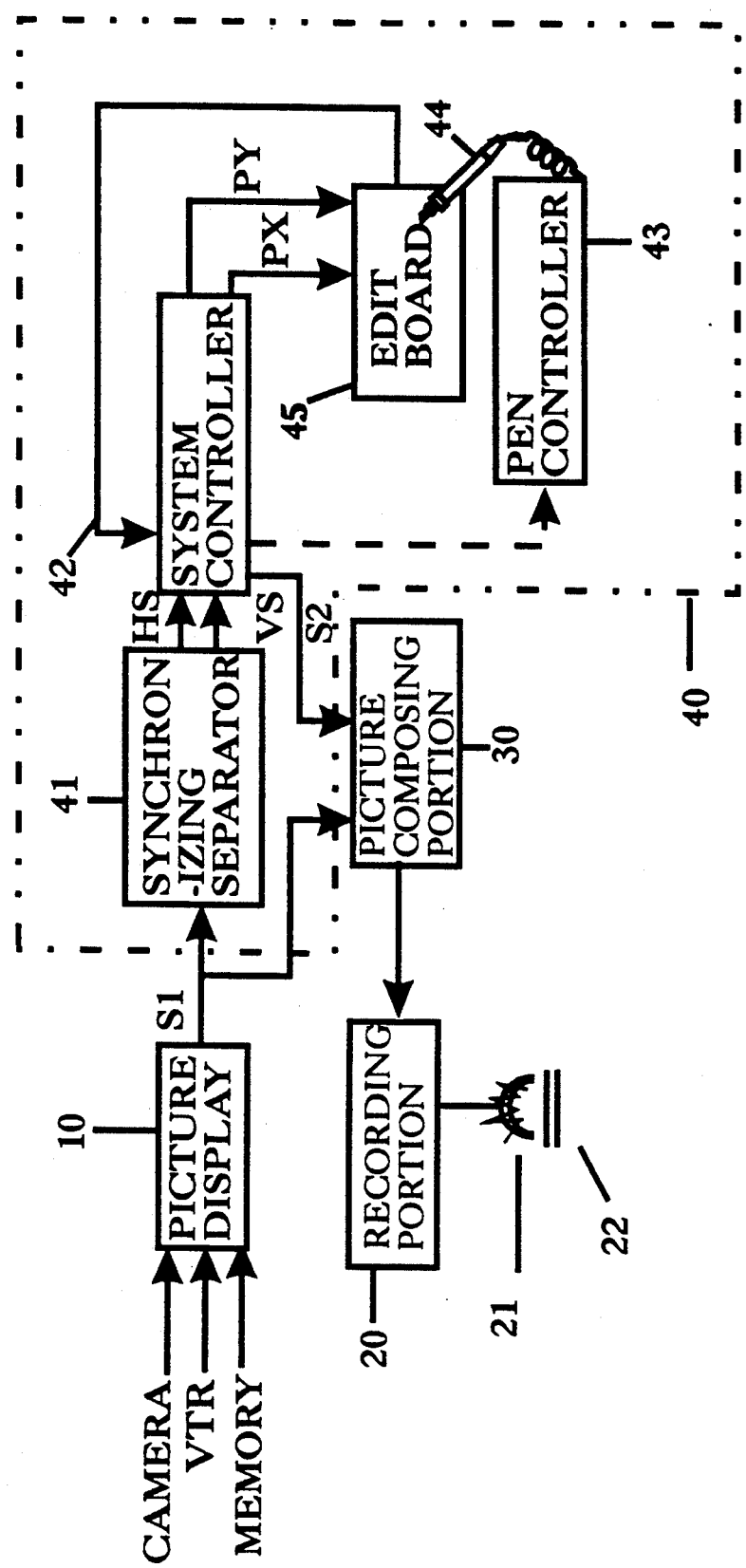
FIG. 1 is a schematic block diagram for explaining an embodiment of the editing system according to the present invention.

FIG. 1 shows a schematic block diagram of one embodiment of the editing system according to the present invention, which is provided with a digitizer type picture input portion.

The editing system for a camcorder shown in FIG. 1 comprises a picture input portion 40 including a synchronizing signal separator 41 for outputting the vertical and horizontal synchronizing signals by separating the picture signal S1 input from the picture display 10, a system controller 42 for controlling the system, an edit board 45, a stylus pen 44 and a pen controller 43; a picture composing portion 30 for combining the primary picture signal S1 with the secondary picture signal S2; and, a recording portion 20 for recording the output signal from the picture composing portion 30 on the magnetic recording tape 22 through a head 21.

Preferably, the picture source for the picture signal input to the picture displaying portion 10 is a camera of the camcorder, or separate video tape recorder, or picture memory.

In accordance with the editing system of the first embodiment as constructed above, it is preferable that door D is located on the side of the camcorder body M, within which the edit board 45 and stylus pen 44 are installed.

The operation of the editing system as constructed above will be explained below.

The picture signal S1 is input to the picture composing portion 30 and the synchronizing signal separator 41, respectively. Then, control portion 42 outputs the X-scan signal PX and Y-scan signal PY according to the vertical and horizontal signals which were output from the synchronizing signal separator 41.

At this time, if a predetermined pattern is drawn on the edit board 45 by the user with the stylus pen 44, it is processed by the system controller 42, and is output to the picture composing portion 30 as a second picture signal S2. Then, the resultant signal is recorded on the video magnetic tape.

In the above editing process, since the potential of the edit board 45 is low, and the potential of the stylus pen 44 is high, the coordinate value at which the potential difference between the edit board and stylus pen is formed is recognized by the system controller 42, and the signal is recorded on the video tape 22 after passing through the picture composing portion 30.

Figure 2:
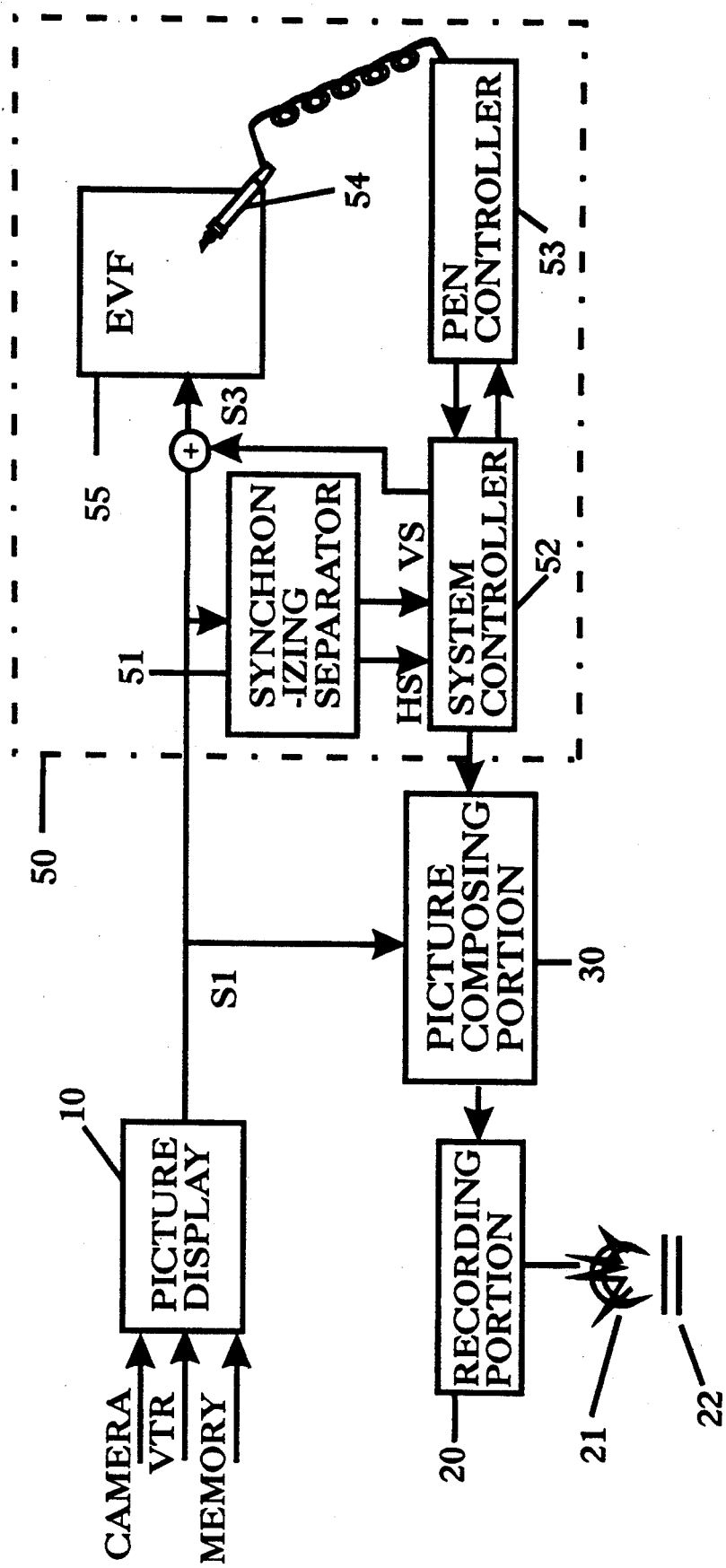
FIG. 2 is a schematic block diagram for explaining another embodiment of the editing system according to the present invention.
Figure 3:
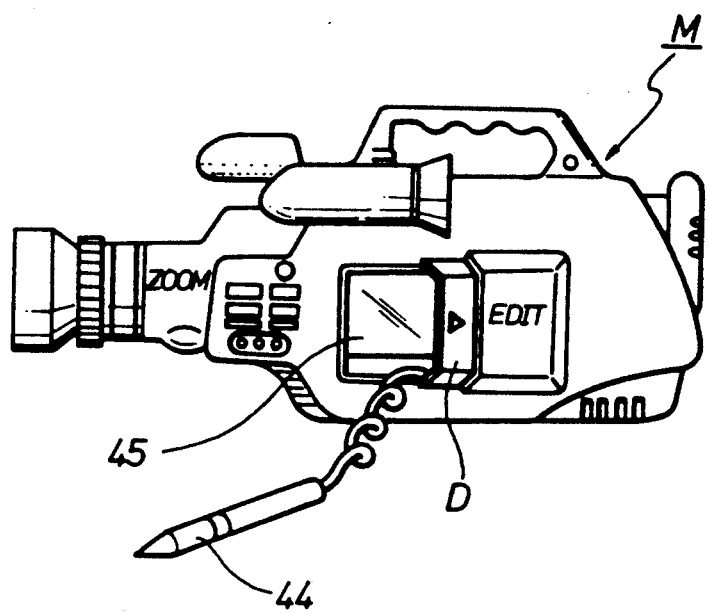
FIG. 3 is a schematic side view of a camcorder of the first embodiment according to the present invention shown in FIG. 1.
Figure 4:
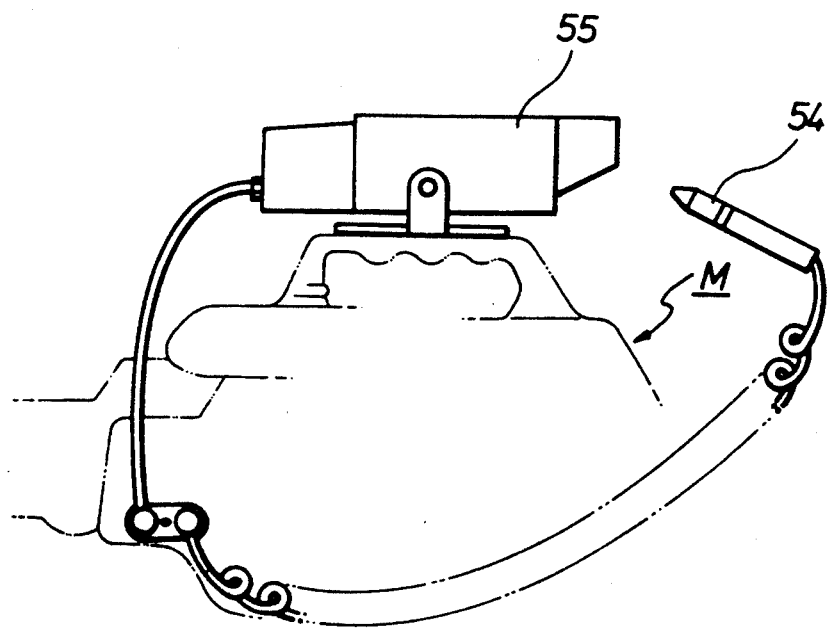
FIG. 4 is a schematic side view of a camcorder of the second embodiment according to the present invention shown in FIG. 2.

On the other hand, FIG. 2 shows another embodiment of the editing system according to the present invention, in which the picture input portion 50 is provided with a light pen 54 instead of the stylus pen 44 of the first embodiment.

In the above embodiment, the electronic view finder 55 (EVF) or separate large-sized electronic view finder can be used to display the image from picture display 10.

The user can draw the secondary picture directly onto the EVF with the light pen 54 while viewing the EVF. The system controller 52 allows the secondary picture to be addressed by outputting a grid signal to the picture signal S1.

In the editing system according to the present embodiment, it is desirable that the input picture is displayed on a large-sized EVF 55 which is coupled to the body M, and that the light pen 54 is connected to the body M.

In accordance with this embodiment, the user is able to input the secondary picture while viewing the primary picture, so that the secondary picture can easily be set in the pattern position thereof.

As mentioned above, according to the present invention, the secondary pictures such as various titles can be superimposed on the recorded program without erasing any portion of the recorded program, and can easily be set in position. Various changes and modifications may be made within the scope of the invention concept.

What is claimed is:

1. An editing system, comprising:
   picture display means for providing a primary picture signal;
   picture input means for receiving said primary picture signal and providing a secondary picture signal, said picture input means comprising an electronic view finder with means for drawing the secondary picture signal on the electronic view finder;
   picture composing means for providing an output picture signal by combining the secondary picture signal with the primary picture signal; and
   means for recording said output picture signal separately from said primary picture signal.

2. An editing system of a camcorder having a body, comprising:
   picture display means for providing a primary picture signal;
   picture input means installed on the body of the camcorder for receiving input of said primary picture signal, said picture input means comprising means for drawing a secondary picture signal on an electronic view finder;
   picture composing means for providing an output picture signal by superimposing the secondary picture signal onto the primary picture signal; and
   means for recording said output picture signal separately from said primary picture signal.

3. The editing system of claim 2, wherein said picture display means comprises one of a video camera, a video tape recorder and a picture memory.

4. The editing system of claim 2, wherein said picture input means further comprises an electronic view finder displaying said primary picture signal; and
   means for drawing an image corresponding to the secondary picture signal on said electronic view finder.

5. An editing system of a camcorder having a body, comprising:
   picture display means for providing a primary picture signal;
   picture input means for receiving input of said primary picture signal and providing a secondary picture signal, said picture input means comprising an electronic view finder for displaying said primary picture signal, and means for drawing an image corresponding to the secondary picture signal on said electronic view finder, said electronic view finder and drawing means being installed onto said body of the camcorder;
   picture composing means for providing an output picture signal by superimposing the secondary picture signal onto the primary picture signal; and
   means for recording said output picture signal separately from said primary picture signals.

6. The editing system of claim 5, wherein said picture display means comprises one of a video tape recorder, a video camera and a picture memory.

7. The editing system of claim 5, wherein said picture input means further comprises a digitizer installed onto said body of the camcorder, said digitizer comprising a stylus pen and an edit board for providing the secondary picture signal.

* * * * *

UNITED STATES PATENT AND TRADEMARK OFFICE
CERTIFICATE OF CORRECTION

PATENT NO. : 5,239,419
DATED : 24 August 1993
INVENTOR(S) : Kyung-tae Kim It is certified that error appears in the above-identified patent and that said Letters Patent is hereby corrected as shown below:

Column 1, line 23, before "photographed", insert ---is---.

Signed and Sealed this

Second Day of August, 1994

Attest:

BRUCE LEHMAN

*Attesting Officer*      *Commissioner of Patents and Trademarks*